United States Patent
Oberheide et al.

(10) Patent No.: US 9,544,143 B2
(45) Date of Patent: Jan. 10, 2017

(54) SYSTEM AND METHOD OF NOTIFYING MOBILE DEVICES TO COMPLETE TRANSACTIONS

(75) Inventors: Jon Oberheide, Ann Arbor, MI (US); Douglas Song, Ann Arbor, MI (US); Adam Goodman, Ann Arbor, MI (US)

(73) Assignee: Duo Security, Inc., Ann Arbor, MI (US)

(*) Notice: Subject to any disclaimer, the term of this patent is extended or adjusted under 35 U.S.C. 154(b) by 0 days.

(21) Appl. No.: 13/039,209

(22) Filed: Mar. 2, 2011

(65) Prior Publication Data

US 2011/0219230 A1 Sep. 8, 2011

Related U.S. Application Data

(60) Provisional application No. 61/309,885, filed on Mar. 3, 2010.

(51) Int. Cl.
| | |
|---|---|
| *H04L 9/32* | (2006.01) |
| *G06F 21/30* | (2013.01) |
| *H04W 12/06* | (2009.01) |
| *G06F 21/31* | (2013.01) |
| *H04W 12/08* | (2009.01) |

(52) U.S. Cl.
CPC ............ *H04L 9/32* (2013.01); *G06F 21/305* (2013.01); *G06F 21/31* (2013.01); *H04L 9/321* (2013.01); *H04W 12/06* (2013.01); *H04W 12/08* (2013.01)

(58) Field of Classification Search
CPC .......... H04L 9/32; H04L 9/321; H04W 12/08; H04W 12/06; G06F 21/31; G06F 21/305
USPC ...... 713/168–170, 155, 188; 726/5, 1, 9, 11, 726/23, 24, 26; 705/17, 67, 75
See application file for complete search history.

(56) References Cited

U.S. PATENT DOCUMENTS

| | | | |
|---|---|---|---|
| 5,838,792 A | 11/1998 | Ganesan | |
| 5,870,723 A | 2/1999 | Pare et al. | |
| 6,119,096 A | 9/2000 | Mann et al. | |
| 6,209,091 B1 | 3/2001 | Sudia et al. | |
| 6,694,025 B1 | 2/2004 | Epstein et al. | |
| 6,758,394 B2 | 7/2004 | Maskatiya et al. | |
| 6,823,359 B1 | 11/2004 | Heidingsfeld et al. | |
| 6,934,858 B2 | 8/2005 | Woodhill | |
| 6,956,950 B2 | 10/2005 | Kausik | |
| 7,096,354 B2 | 8/2006 | Wheeler et al. | |
| 7,331,518 B2 * | 2/2008 | Rable | G06Q 20/10 235/380 |

(Continued)

OTHER PUBLICATIONS

Edge, Kenneth, et al. "The use of attack and protection trees to analyze security for an online banking system." System Sciences, 2007. HICSS 2007. 40th Annual Hawaii International Conference on. IEEE, 2007.*

(Continued)

*Primary Examiner* — Kari Schmidt
(74) *Attorney, Agent, or Firm* — Jeffrey Schox; Padowithz Alce (57) ABSTRACT

A method including registering an authority device for an account on an auth platform; receiving transaction request from an initiator to the auth platform; messaging the authority device with the transaction request; receiving an authority agent response from the authority device to the auth platform; if the authority agent response confirms the transaction, communicating a confirmed transaction to the initiator; and if the authority agent response denies the transaction, communicating a denied transaction to the initiator.

15 Claims, 5 Drawing Sheets

(56) References Cited

U.S. PATENT DOCUMENTS

| | | | |
|---|---|---|---|
| 7,447,784 B2* | 11/2008 | Eun .............................. | 709/229 |
| 7,463,637 B2 | 12/2008 | Bou-Diab et al. | |
| 7,496,662 B1 | 2/2009 | Roesch et al. | |
| 7,526,792 B2 | 4/2009 | Ross | |
| 7,562,382 B2 | 7/2009 | Hinton et al. | |
| 7,574,733 B2 | 8/2009 | Woodhill | |
| 7,711,122 B2 | 5/2010 | Allen et al. | |
| 7,953,979 B2 | 5/2011 | Borneman et al. | |
| 7,982,595 B2 | 7/2011 | Hanna et al. | |
| 8,028,329 B2 | 9/2011 | Whitcomb | |
| 8,136,148 B1 | 3/2012 | Chayanam et al. | |
| 8,161,527 B2 | 4/2012 | Curren | |
| 8,200,980 B1 | 6/2012 | Robinson et al. | |
| 8,245,044 B2* | 8/2012 | Kang ..................... | G06Q 20/12 705/35 |
| 8,332,627 B1 | 12/2012 | Matthews et al. | |
| 8,335,933 B2 | 12/2012 | Humphrey et al. | |
| 8,397,301 B2 | 3/2013 | Hering et al. | |
| 8,402,526 B2 | 3/2013 | Ahn | |
| 8,458,798 B2 | 6/2013 | Williams et al. | |
| 8,495,720 B2 | 7/2013 | Counterman | |
| 8,499,339 B2 | 7/2013 | Chao et al. | |
| 8,510,820 B2 | 8/2013 | Oberheide et al. | |
| 8,538,028 B2 | 9/2013 | Yeap et al. | |
| 8,539,567 B1 | 9/2013 | Logue et al. | |
| 8,627,438 B1 | 1/2014 | Bhimanaik | |
| 8,646,086 B2 | 2/2014 | Chakra et al. | |
| 8,689,287 B2 | 4/2014 | Bohmer et al. | |
| 8,700,729 B2 | 4/2014 | Dua | |
| 8,732,475 B2 | 5/2014 | Fahrny et al. | |
| 8,732,839 B2 | 5/2014 | Hohl | |
| 8,745,703 B2 | 6/2014 | Lambert et al. | |
| 8,763,077 B2 | 6/2014 | Oberheide et al. | |
| 8,806,609 B2 | 8/2014 | Gladstone et al. | |
| 2,639,997 A1 | 9/2014 | Wiesmaier et al. | |
| 8,850,516 B1 | 9/2014 | Hrebicek et al. | |
| 8,893,230 B2 | 11/2014 | Oberheide et al. | |
| 8,898,762 B2* | 11/2014 | Kang ..................... | G06Q 20/12 705/44 |
| 9,223,961 B1 | 12/2015 | Sokolov | |
| 9,282,085 B2 | 3/2016 | Oberheide et al. | |
| 2002/0123967 A1 | 9/2002 | Wang | |
| 2003/0115452 A1 | 6/2003 | Sandhu et al. | |
| 2003/0120931 A1 | 6/2003 | Hopkins et al. | |
| 2003/0126472 A1 | 7/2003 | Banzhof | |
| 2003/0147536 A1 | 8/2003 | Andivahis et al. | |
| 2004/0064706 A1 | 4/2004 | Lin et al. | |
| 2004/0218763 A1 | 11/2004 | Rose et al. | |
| 2005/0218215 A1 | 10/2005 | Lauden | |
| 2005/0221268 A1 | 10/2005 | Chaar et al. | |
| 2005/0240522 A1 | 10/2005 | Kranzley et al. | |
| 2005/0268107 A1* | 12/2005 | Harris et al. .................. | 713/182 |
| 2006/0130139 A1 | 6/2006 | Sobel et al. | |
| 2006/0165060 A1 | 7/2006 | Dua | |
| 2006/0182276 A1 | 8/2006 | Sandhu et al. | |
| 2006/0184788 A1 | 8/2006 | Sandhu et al. | |
| 2006/0242692 A1 | 10/2006 | Thione et al. | |
| 2007/0016948 A1 | 1/2007 | Dubrovsky et al. | |
| 2007/0081667 A1 | 4/2007 | Hwang | |
| 2007/0199060 A1 | 8/2007 | Touboul | |
| 2007/0228148 A1* | 10/2007 | Rable ..................... | G06Q 20/10 235/379 |
| 2007/0250914 A1 | 10/2007 | Fazal | |
| 2007/0258594 A1 | 11/2007 | Sandhu et al. | |
| 2007/0284429 A1 | 12/2007 | Beeman | |
| 2008/0049642 A1 | 2/2008 | Gudipudi et al. | |
| 2008/0069347 A1 | 3/2008 | Brown et al. | |
| 2008/0120411 A1* | 5/2008 | Eberle ..................... | G06Q 50/10 709/225 |
| 2008/0229104 A1 | 9/2008 | Ju et al. | |
| 2009/0055906 A1 | 2/2009 | Wendorff | |
| 2009/0077060 A1 | 3/2009 | Sermersheim et al. | |
| 2009/0187986 A1 | 7/2009 | Ozeki | |
| 2009/0210705 A1 | 8/2009 | Chen | |
| 2009/0300596 A1 | 12/2009 | Tyhurst et al. | |
| 2009/0300707 A1 | 12/2009 | Garimella et al. | |
| 2010/0042954 A1 | 2/2010 | Rosenblatt et al. | |
| 2010/0069104 A1 | 3/2010 | Neil et al. | |
| 2010/0114740 A1 | 5/2010 | Dominguez et al. | |
| 2010/0115578 A1 | 5/2010 | Nice et al. | |
| 2010/0121767 A1* | 5/2010 | Coulter et al. .................. | 705/67 |
| 2010/0125737 A1* | 5/2010 | Kang ..................... | G06Q 20/12 713/176 |
| 2010/0131755 A1 | 5/2010 | Zhu et al. | |
| 2010/0180001 A1* | 7/2010 | Hardt ..................... | G06F 11/32 709/207 |
| 2010/0202609 A1 | 8/2010 | Sandhu et al. | |
| 2010/0216425 A1* | 8/2010 | Smith .......................... | 455/406 |
| 2010/0217986 A1 | 8/2010 | Schneider | |
| 2010/0233996 A1 | 9/2010 | Herz et al. | |
| 2010/0257610 A1 | 10/2010 | Hohl | |
| 2010/0330969 A1 | 12/2010 | Kim et al. | |
| 2011/0026716 A1 | 2/2011 | Tang et al. | |
| 2011/0086616 A1 | 4/2011 | Brand et al. | |
| 2011/0107389 A1 | 5/2011 | Chakarapani | |
| 2011/0119765 A1 | 5/2011 | Hering et al. | |
| 2011/0138469 A1 | 6/2011 | Ye et al. | |
| 2011/0197267 A1 | 8/2011 | Gravel et al. | |
| 2011/0219449 A1 | 9/2011 | St. Neitzel et al. | |
| 2011/0277025 A1 | 11/2011 | Counterman | |
| 2011/0302410 A1 | 12/2011 | Clarke et al. | |
| 2011/0302630 A1 | 12/2011 | Nair et al. | |
| 2012/0090028 A1 | 4/2012 | Lapsley et al. | |
| 2012/0096274 A1 | 4/2012 | Campagna et al. | |
| 2012/0198050 A1 | 8/2012 | Maki et al. | |
| 2012/0198228 A1 | 8/2012 | Oberheide et al. | |
| 2012/0216239 A1 | 8/2012 | Yadav et al. | |
| 2012/0227098 A1 | 9/2012 | Obasanjo et al. | |
| 2012/0300931 A1 | 11/2012 | Ollikainen et al. | |
| 2013/0042002 A1 | 2/2013 | Cheeniyil et al. | |
| 2013/0060708 A1 | 3/2013 | Oskolkov et al. | |
| 2013/0081101 A1 | 3/2013 | Baer et al. | |
| 2013/0097585 A1 | 4/2013 | Jentsch et al. | |
| 2013/0110676 A1 | 5/2013 | Kobres | |
| 2013/0117826 A1 | 5/2013 | Gordon et al. | |
| 2013/0125226 A1 | 5/2013 | Shah et al. | |
| 2013/0174246 A1 | 7/2013 | Schrecker et al. | |
| 2013/0179681 A1 | 7/2013 | Benson et al. | |
| 2013/0239167 A1 | 9/2013 | Sreenivas et al. | |
| 2013/0239168 A1 | 9/2013 | Sreenivas et al. | |
| 2013/0239177 A1 | 9/2013 | Sigurdson et al. | |
| 2013/0326224 A1 | 12/2013 | Yavuz | |
| 2013/0326493 A1 | 12/2013 | Poonamalli et al. | |
| 2014/0047546 A1 | 2/2014 | Sidagni | |
| 2014/0188796 A1 | 7/2014 | Fushman et al. | |
| 2014/0208405 A1 | 7/2014 | Hashai | |
| 2014/0235230 A1 | 8/2014 | Raleigh | |
| 2014/0237236 A1 | 8/2014 | Kalinichenko et al. | |
| 2014/0244993 A1 | 8/2014 | Chew | |
| 2014/0245278 A1 | 8/2014 | Zellen | |
| 2014/0245396 A1 | 8/2014 | Oberheide et al. | |
| 2014/0351954 A1 | 11/2014 | Brownell et al. | |
| 2015/0012914 A1 | 1/2015 | Klein et al. | |

OTHER PUBLICATIONS

Neuenhofen, Kay, and Matthew Thompson. "A secure marketplace for mobile java agents." Proceedings of the second international conference on Autonomous agents. ACM, 1998.(pp. 212-218).*

Symantec, Administration Guide for Symantec TM Endpoint Protection and Symantec Network Access Control, Aug. 1, 2007.

Simske et al., "APEX: Automated Policy Enforcement eXchange", Sep. 21-24, 2010, ACM, pp. 139-142.

Goldfeder et al., Securing Bitcoin wallets via a new DSA/ECDSA threshold signature scheme, http://www.cs.princeton.edu/~stevenag/threshold_sigs.pdf.

Symantec, Administration guide for symantec Endpoint protection and symantec network access control, 2009, version 11.00.05.00.00.

* cited by examiner

SYSTEM AND METHOD OF NOTIFYING MOBILE DEVICES TO COMPLETE TRANSACTIONS

CROSS-REFERENCE TO RELATED APPLICATIONS

This application claims the benefit of U.S. Provisional Application No. 61/309,885, filed 3 Mar. 2010, titled "SYSTEM AND METHOD OF USING PUSH-BASED CHALLENGES ON MOBILE DEVICES FOR AUTHENTICATION OR AUTHORIZATION", which is incorporated in its entirety by this reference.

TECHNICAL FIELD

This invention relates generally to the digital security services field, and more specifically to a new and useful system and method of notifying mobile devices to complete transactions in the digital security field.

BACKGROUND

Fraudulent transactions, whether executed online by a malicious party who has stolen a user's online banking password or offline by a malicious party entering a restricted building using a forged identification card, are indicators of a lack of authentication in present day security systems. Similarly, authorization (permission to complete a transaction) is limited without a strong notion of authentication. Traditionally, techniques for authentication are classified into several broad classes such as "what you know" (e.g., passwords or a social security number), "what you have" (e.g., physical possessions such as ATM cards or a security dongle), and "what you are" (e.g., biometric information such as a finger print or DNA). However, many of these solutions are burdensome to users, requiring the user to remember information or carry extra devices to complete a transaction. Thus, there is a need in the digital security services field to create a new and useful system and method of notifying mobile devices to complete transactions. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
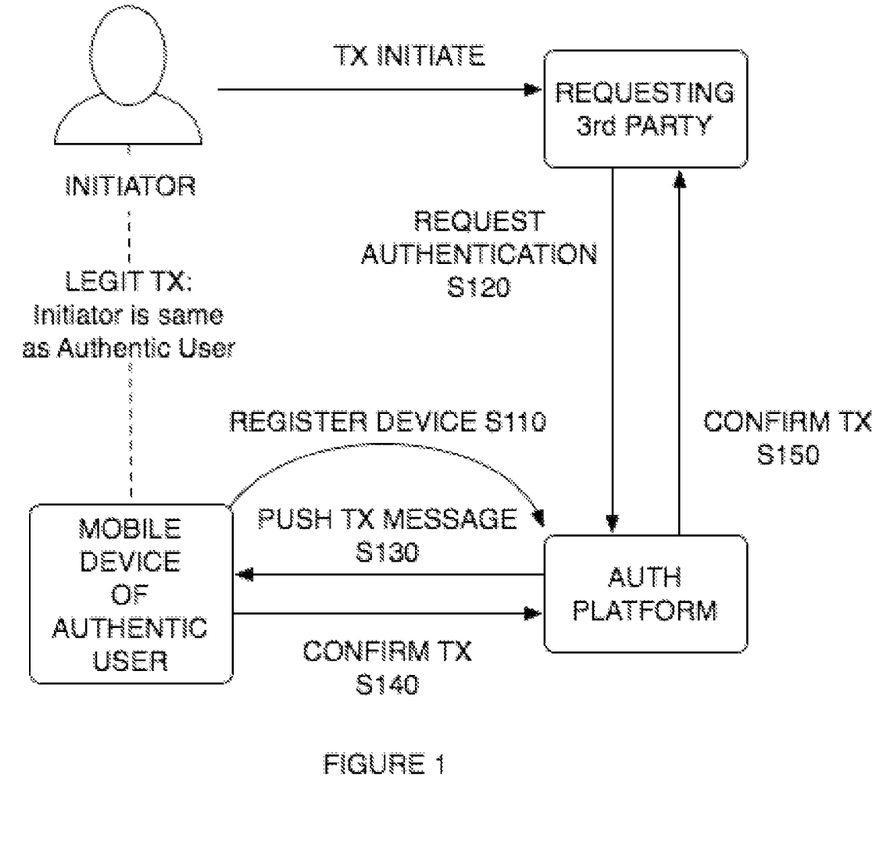
FIGS. 1 and 2 are schematic representations of a method of a preferred embodiment for authenticating a transaction.
Figure 2:
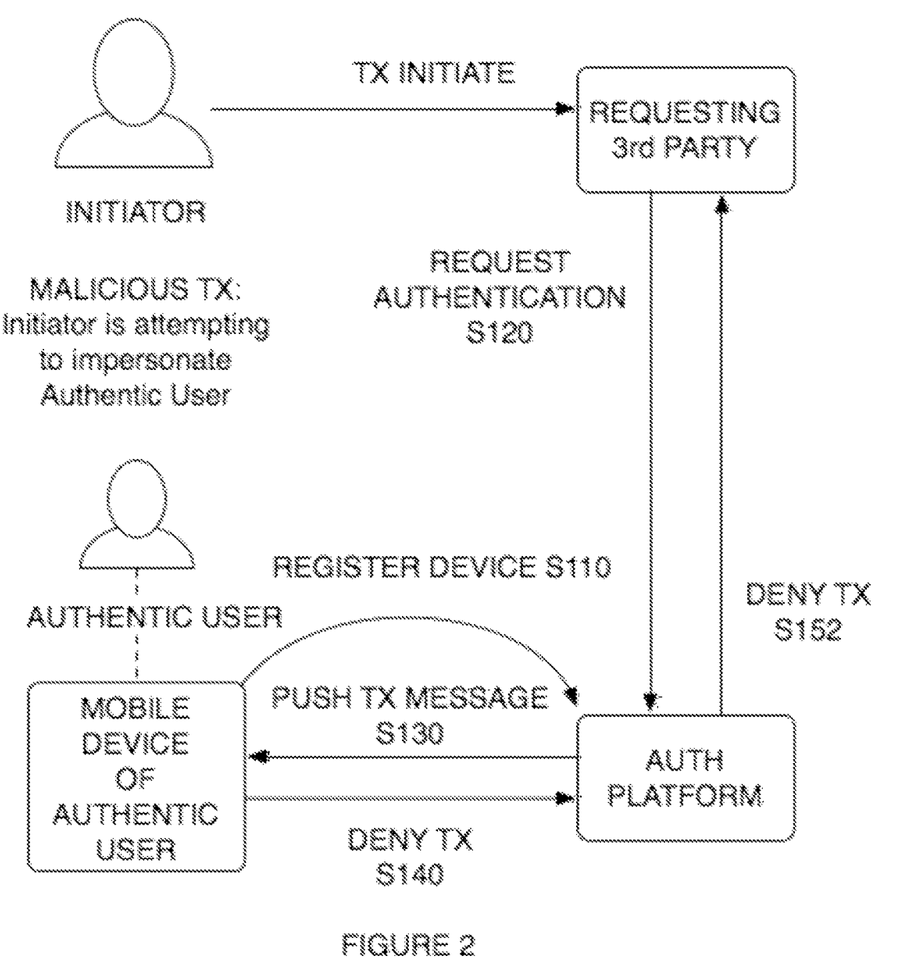
Figure 3:
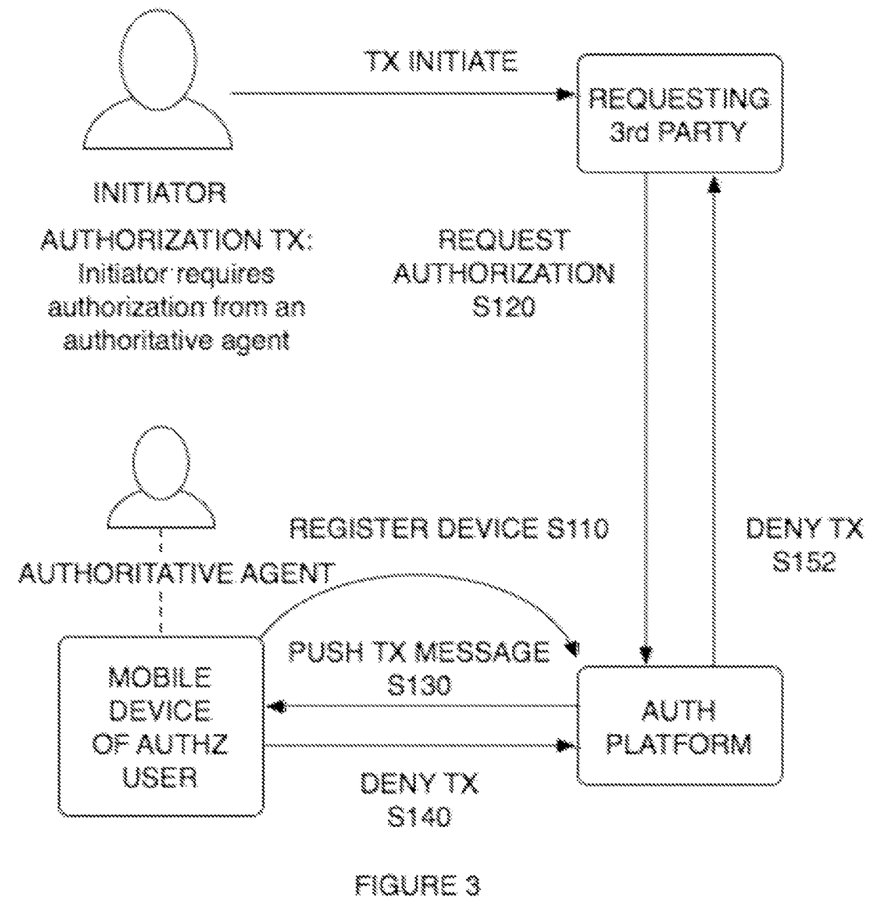
FIG. 3 is a schematic representation of a method of a preferred embodiment for authorizing a transaction.

As shown in FIGS. 1-3, the method of the preferred embodiments for notifying mobile devices to complete transactions includes registering an authority device for an account on an auth platform S110, receiving a transaction request from an initiator to the auth platform S120, messaging the authority device with the transaction request S130, receiving an authority agent response from the authority device to the auth platform S140, if the authority agent response confirms the transaction, communicating a confirmed transaction to the initiator S150, and if the authority agent response denies the transaction, communicating a denied transaction to the initiator S152. The method functions to use push-based challenges on mobile device for the authentication and/or authorization of parties involved in a transaction. The method functions to utilize non-intrusive techniques while providing improved security. The pushed messages preferably alert a user to the transaction request in real-time such that a decision of confirmation or denial of a transaction can be communicated to a requesting party with minimal time lag (e.g., preferably less than a minute, and more preferably less than 10 seconds). The method may be employed as standalone transaction validation or incorporated into a multifactor system. The method may be used in application such as web-based applications, remote access credentials, privileged account management, financial transactions, password recovery/reset mechanisms, physical access control, Automatic Teller Machine (ATM) withdrawals, domain name transfers, online or offline transactions, building access security, or any suitable application requiring authentication and/or authorization.

The method is preferably performed by an auth platform that communicates with a client of an initiating agent and an authority device associated with an account of the auth platform. The auth platform is preferably an internet accessible server that may be hosted on a distributed computing system, but may be hosted on any suitable platform. The initiating agent is typically a user or process that initiates a transaction. The requested transaction is preferably initiated by the initiating agent through a client such as a website, application, or device (e.g., an ATM machine). For authentication, the initiator agent may be a legitimate party or a malicious party attempting to fraudulently impersonate the legitimate party. For authorization, the initiating agent may be a legitimate authenticated party but may require approval from other parties to perform the action of the transaction. The authority device is preferably a device associated with an authentic agent that is a user or process that is legitimately authenticated or authorized to execute transactions. Even if a malicious entity were attempting to impersonate a user or authentic agent through stolen credentials or other means, they would—ideally—lack the authority device to complete a transaction.

Figure 4:
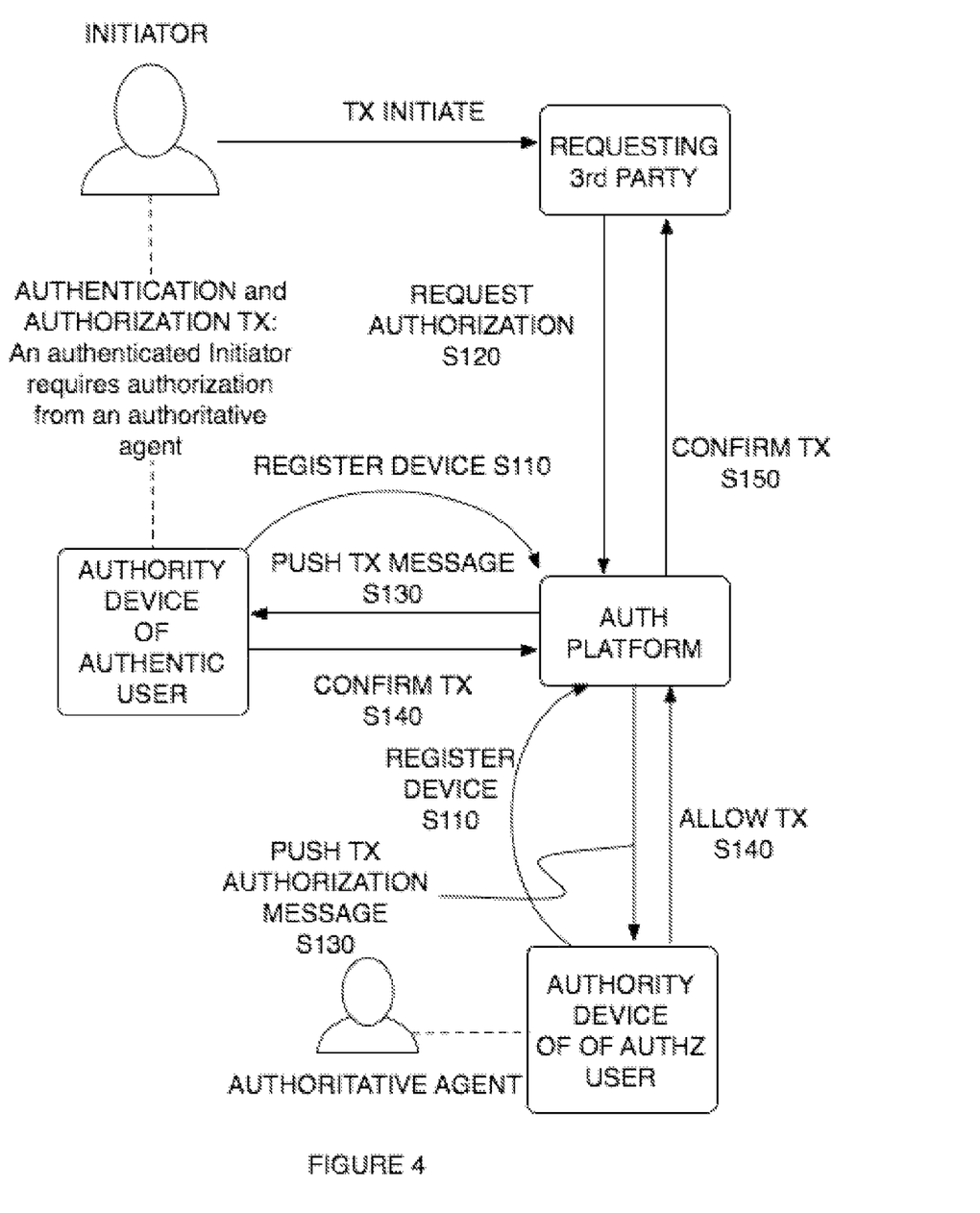
FIG. 4 is a schematic representation of a method of a preferred embodiment for authenticating and authorizing a transaction.
Figure 5:
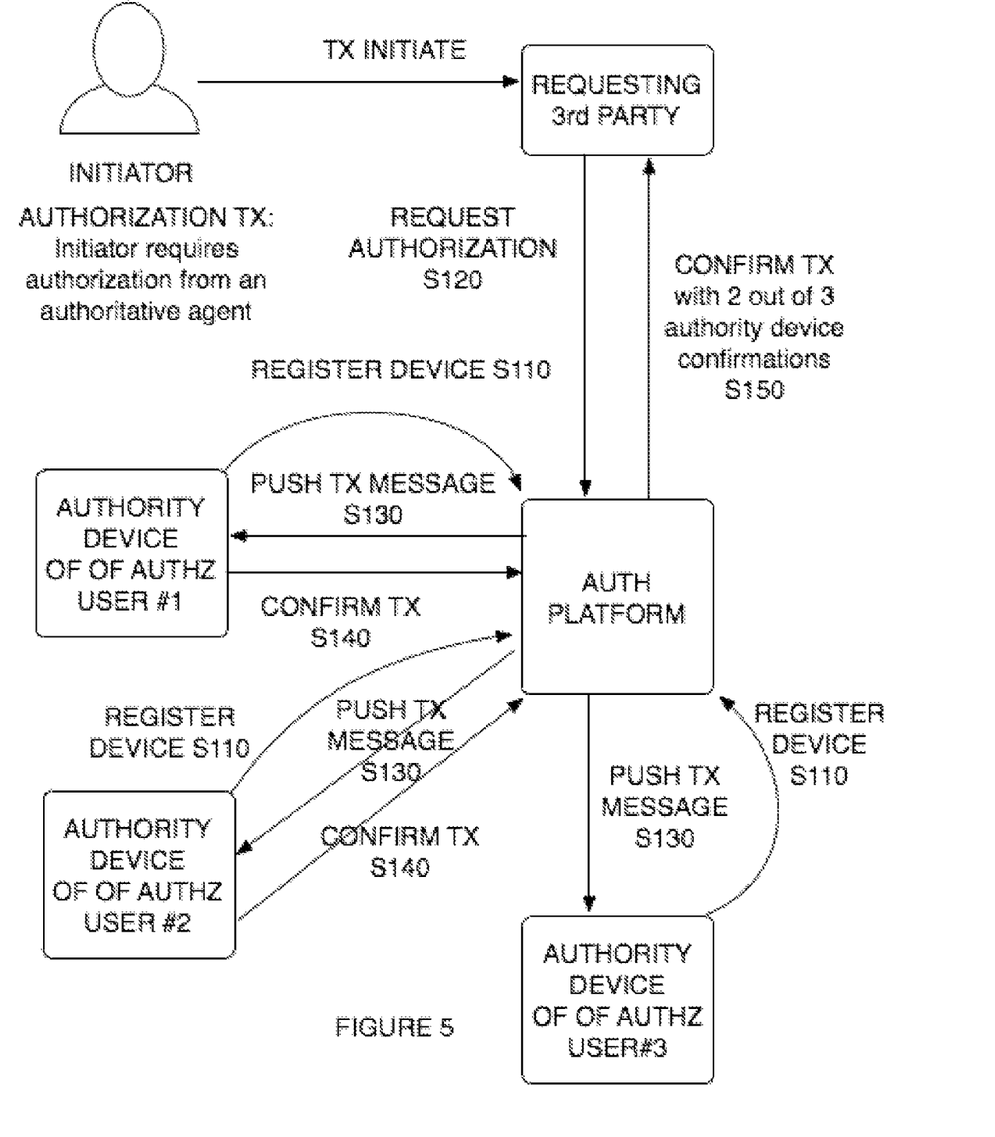
FIG. 5 is a schematic representation of a method of a preferred embodiment with a plurality of authority devices.

Step S110, which includes registering an authority device for an account on an auth platform, functions to identify a device of an agent that is permitted to authenticate or authorize transactions. The registration preferably occurs prior to a transaction request, and is preferably performed during an initial setup of an account on the auth platform. During the setup authentication and/or authorization rules are preferably set. The authority device is preferably a mobile computing device possessed by an authentic user or an authorized agent. The mobile device is preferably a mobile phone, tablet computer, smartphone, personal data assistant (PDA), personal computer, and/or any suitable computing device. The authority device preferably has access to a network over which communication with the auth platform is performed, such as a WiFi network, local-area network, telephony network, short message service (SMS) network, multimedia messaging service (MMS), or any suitable network. A plurality of devices may additionally be registered, as shown in FIG. 5. A second authority device may provide a backup communication point if a primary authority device does not respond. For example, after attempting to contact a primary authority device, the auth platform may message a secondary authority device for authentication or authorization. Or, alternatively, a threshold of two confirmations may need to be received to authorize a transaction. Additionally, a first authority device may be registered for authenticating the identity of an agent of the transaction request, and a second authority device may be registered for authorizing an action of an agent such that authentication and authorization may both be enabled, as shown in FIG. 4.

Step S120, which includes receiving a transaction request from an initiator to the auth platform, functions to initiate a transaction. The transaction is preferably any event, transfer, action, or activity that requires authentication and/or authorization of an involved party. Exemplary transactions may include logging into a website, application or computer system; a user withdrawing money from an ATM; a user initiating a "forgotten password" procedure; a user attempting to enter a restricted area of a building or environment; a payment exchange between two entities; a user attempting to perform a restricted action in a computer system; and/or any suitable application requiring authentication and/or authorization. Authentication preferably includes validating the identity of at least one involved party relevant to a transaction. Authorization preferably includes validating authority or permission of an entity to execute a transaction. For authentication, the authority device preferably belongs to the authentic user for self-approval of transactions. For authorization, the authority device preferably belongs to an authoritative user that is preferably in charge of regulating transactions of a user involved in the transaction. The transactions are preferably initiated in an online environment, where parties may be communicating using a computing device or public/private network, but the transactions may alternatively occur offline where parties may be interacting in the real world. The user or device initiating the transaction is ideally a legitimate party, as shown in FIG. 1, but in the situations where a malicious party initiates or participates in the transaction, the method is preferably able to properly identify such a situation, as shown in FIG. 2. After a malicious transaction is prevented the approval rules for a transaction may be dynamically altered to increase security. The transaction is preferably sent from a requesting entity such as a website, application, or device. The requesting entity is typically a system in communication with the auth platform. An application programming interface (API) or any suitable protocol is preferably used to communicate between the requesting entity and the auth platform. In one variation, the communication sent from the requester is encrypted and the authority device preferably decrypts the information. This variation preferably prevents the auth platform from inspecting or accessing the communicated information which may be applicable when a third party is passing sensitive information through the auth platform. As an alternative variation, the communication between the requester and the auth platform is preferably encrypted or otherwise cryptographically protected and communication between the auth platform and the authority device verifies that the communication is from the authority device. Any suitable steps may be taken to secure the communication between the requesting entity, the auth platform and the authority device.

Step S130, which includes messaging the authority device with the transaction request, functions to push a notification to a secondary device for authentication or authorization. The authority device is preferably a device only the authentic user or an authorized user would possess. The message is preferably sent through a communication channel between the authority device and the auth platform. The communication channel is preferably a push notification service provided through the authority device. The communication channel may alternatively be a short message system SMS network, email, a instant message, an in-app notification system, web based websocket or publication-subscription channels, image based transmission of transaction information such as through QR-codes captured by a camera, or any suitable technique for messaging the device. The messages preferably appear on the authority device or create an alert in substantially real-time (e.g., in less than 5 minutes). The realtime aspect of the messaging functions to enable authentication and authorization at the time of the transaction. In one variation, tracking a registered authority device may additionally be performed by the auth platform. For example, in a persistent TCP/IP connection model, a mobile device moving from a service provider data network to a WiFi network may change IP addresses and therefore initiate a new persistent connection. Upon receiving that new connection and an identifier of the mobile device, the auth platform preferably updates the state of the device for the account associated with that device. Then, the proper connection is preferably used for messaging the authority device. Some communication channels may have limited throughput and lack the capability to present a full message from the auth platform. For example, SMS messages have a 160 character limit. An initial message may include a unique identifier, which can then be used to retrieve a full message. For example, the SMS message may include a URL link or code which can be used to retrieve a full message from an application or website. The full message may provide additional information and options for a transaction response. The messages transmitted over the communication channel may additionally be cryptographically signed and encrypted using an established setup between the auth device and the auth platform. Additionally the messages preferably include transaction information (i.e., metadata). The transaction information may include account or entity name, transaction details, location and time of transaction, IP address of initiating host, geolocation of the IP address or any suitable information or any suitable data on the transaction. In one example an online bank transfer may have a message with transaction information including payer, payee, account numbers, transfer amount, and transaction date and time.

Step S140, which includes receiving an authority agent response from the authority device to the auth platform, functions to process a response from an authentic user or authorized user. The response preferably confirms or denies a transaction. The confirmation and denial of a transaction may additionally be set to indicate any suitable form of response. Preferably, the initial options are to accept or reject a transaction. Additionally, if a transaction is rejected a reason for rejection may be included such as "canceled because of change of mind" or "possible malevolent transaction". Other variations may include a variety of options that may change based on the application. The available forms of responses may be included in the message information. Other forms of responses may allow a variety of multiple-choice options, variable setting options, or any suitable form of response input. For example, if a parent is acting as an authorization provider for an ATM withdraws made by a child, a message may be sent to a phone of the parent indicating that the child is attempting to withdraw a particular amount (e.g., $50). The parent may be able to respond allowing a withdrawal of only a lower amount (e.g., $20). As an additional sub-step to receiving an authority agent response, the response is preferably verified to be a legitimate response from the authority device as opposed to an entity imitating the device. Secure Socket Layer (SSL), a Hash-based Message Authentication Code (HMAC), message signing, or any suitable cryptographic protocol may be used to verify the response is from the authority device.

Step S150 and S152, which includes if the authority agent response confirms the transaction, communicating a confirmed transaction to the initiator, and if the authority agent response denies the transaction, communicating a denied transaction to the initiator, function to communicate the authentication and/or authorization to the initiator of the transaction. Any suitable response to a transaction is preferably communicated back to the requesting entity (e.g., a third party website or an ATM machine). The requesting entity can then preferably take appropriate action. If the transaction is confirmed or approved, the transaction proceeds. If the transaction is denied or altered, the requesting entity preferably hafts or prevents the transaction. The requesting entity can preferably use the transaction response to modify a transaction state in any suitable manner. Based on the variety of responses from authentic users and/or authorized users, rules may determine when to confirm or deny a transaction. In a variation of the method, there may be a plurality of authority devices registered for authorization and/or authentication. A rule may be setup for which authority devices to message, in what order, and the timing of the messaging. Additionally, rules may be set for received responses. A particular threshold for the number of responses from the plurality of authority devices may be set. For example, four authority devices may be messaged for authorization and at least three must confirm the transaction for it to be confirmed. In another example, a plurality of authority devices for authentication may be registered, and the authority devices are messaged one after the other until at least one responds. The response from an authority agent may alternatively be passed on to the requesting entity with no analysis.

An alternative embodiment preferably implements the above methods in a computer-readable medium storing computer-readable instructions. The instructions are preferably executed by computer-executable components preferably integrated with an auth platform. The auth platform is preferably hosted on a distributed computing system or cloud based platform but may alternatively be hosted in any suitable system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device. The auth platform preferably includes an API for third party services and devices to use in initiating transactions and interpreting responses from the auth platform. The platform preferably includes a communication channel such as a public or private network or SMS network to communicate with at least one authority device. The authority device is preferably a mobile phone but may be any suitable personal computing device.

As a person skilled in the art will recognize from the previous detailed description and from the figures and claims, modifications and changes can be made to the preferred embodiments of the invention without departing from the scope of this invention defined in the following claims.

We claim:

1. A method of completing a transaction comprising the steps of:
   registering an authority device for a first account on an auth platform;
   at a website, receiving a login request, the login request comprising a username and password, for a second account; the second account linked to a user identity;
   after verifying the username and password as associated with the second account, transmitting both a login transaction request and a descriptor of the user identity, the descriptor retrieved from the second account, from the website to the auth platform;
   at the auth platform, receiving the login transaction request and the descriptor of the user identity;
   at the auth platform, identifying the first account from the descriptor of the user identity, and identifying the authority device registered for the first account from the first account; messaging the authority device with the login transaction request;
   at the auth platform, receiving an authority agent response from the authority device;
   verifying the authority agent response is from the authority device registered for the account;
   if the authority agent response confirms the transaction in a transaction approval response, communicating a confirmed login transaction response to the website; and
   if the authority agent response denies the login transaction in a transaction rejection response, communicating a denied login transaction response to the website; and
   wherein a plurality of authority devices are registered, and messaging the authority device includes messaging at least two authority devices and wherein a authority agent response is received from at least one of the two authority devices.

2. The method of claim 1, wherein messaging the authority device includes pushing a notification to a mobile application; wherein pushing a notification is performed over a channel with real-time alerts through an application on the authority device.

3. The method of claim 2, wherein pushing a notification includes sending an SMS message to the authority device, the SMS message including a link to a full transaction information and options retrievable through an application.

4. The method of claim 2, wherein messaging the authority device includes messaging a size limited message to the authority device with a unique identifier of a full message and wherein a response is received through an application providing the full message.

5. The method of claim 1, wherein the authority device is a mobile computing device for authentication of a user and wherein the authority agent response confirms or denies the identity of an agent of the login transaction request.

6. The method of claim 1, wherein the authority device is a mobile computing device for authorization of a transaction and wherein the authority agent response confirms or denies a login transaction by an agent; wherein a plurality of authority devices are registered, and messaging the authority device includes messaging at least two authority devices and wherein a received authority agent response is received from at least one of the two authority devices.

7. The method of claim 1, wherein there is at least one authority device registered for authentication and a second authority device registered for authorization; wherein the received authority agent response from the device for authentication is used in confirming or denying the identity of a first agent of the transaction request; and wherein the received authority agent response from the device for authorization is used in confirming or denying an action of the first agent in a transaction; wherein the device for authorization receives authorization from a second agent; wherein the first agent corresponds to a first user and the second agent corresponds to a second user; wherein the first person is distinct from the second person.

8. The method of claim 1, wherein messaging the authority device includes tracking state and communication channels of the authority device; wherein the authority device is a single electronic device.

9. The method of claim 8, wherein a persistent TCP/IP connection is used as a communication channel and messaging the authority device includes initiating a new persistent connection upon network changes of the authority device.

10. The method of claim 1, further comprising cryptographically authenticating the authority agent response from the authority device.

11. The method of claim 1, wherein the login transaction request includes information on claimed identity of the agent of the transaction and an action associated with the login transaction.

12. The method of claim 1, further comprising at the authority device, cryptographically authenticating the authority agent response is from the authority device.

13. The method of claim 1, wherein receiving an authority agent response comprises receiving an authority agent response denying the login transaction in a transaction rejection response; wherein the transaction rejection response is one of a transaction cancelation response and a transaction fraud response; wherein communicating the denied login transaction response to the website comprises:
- if the transaction rejection response is a transaction cancelation response, communicating a cancelled login transaction response to the website, and
- if the transaction rejection response is a transaction fraud response, communicating a fraudulent login transaction response to the website;
- wherein the transaction cancelation response is distinct from the transaction fraud response.

14. The method of claim 1, further comprising;
- at the website, encrypting the login transaction request using an encryption key;
- at the authority device, decrypting the login transaction request using a decryption key;
- wherein the auth platform does not possess the decryption key and cannot decrypt the login transaction request.

15. The method of claim 1, further comprising:
- at the authority device, encrypting the authority agent response, using an encryption key, prior to transmitting the authority agent response to the auth platform;
- at the website, decrypting the authority agent response using a decryption key;
- wherein the auth platform does not possess the decryption key and cannot decrypt the authority agent response.

* * * * *